United States Patent [19]
Ito

[11] 3,776,062
[45] Dec. 4, 1973

[54] SHOCK ABSORBING STEERING SHAFT ASSEMBLY

[76] Inventor: Kiyoji Ito, 8, Nisshin-cho, 2-chome, Kawasaki, Japan

[22] Filed: Apr. 19, 1972

[21] Appl. No.: 245,553

[52] U.S. Cl. .................................. 74/492, 74/527
[51] Int. Cl. ......................... B62d 1/18, G05g 5/06
[58] Field of Search ................... 74/492, 493, 527

[56] References Cited
UNITED STATES PATENTS

| | | | |
|---|---|---|---|
| 2,800,190 | 7/1957 | Dvorak | 74/493 X |
| 2,910,887 | 11/1959 | Helms | 74/493 |

Primary Examiner—Allan D. Herrmann
Attorney—Spensley, Horn et al.

[57] ABSTRACT

A shock absorbing steering wheel assembly having a plurality of detent elements each provided with a proturberance and pivotally secured to a part of the steering wheel shaft and a torque shaft having along its external surface vertical slots in which the detent elements are slidable and the bottom wall of such slots formed with recesses to be engaged by the protuberances of the detent elements. An elastic ring is fitted around the detent elements so that the protuberances are elastically engaged with certain recesses in the torque shaft. In the event of a strong shock or impact force the protuberances are forced out of the recesses in the torque shaft and slide along the vertical slots against the resident holding force of the elastic ring.

9 Claims, 11 Drawing Figures

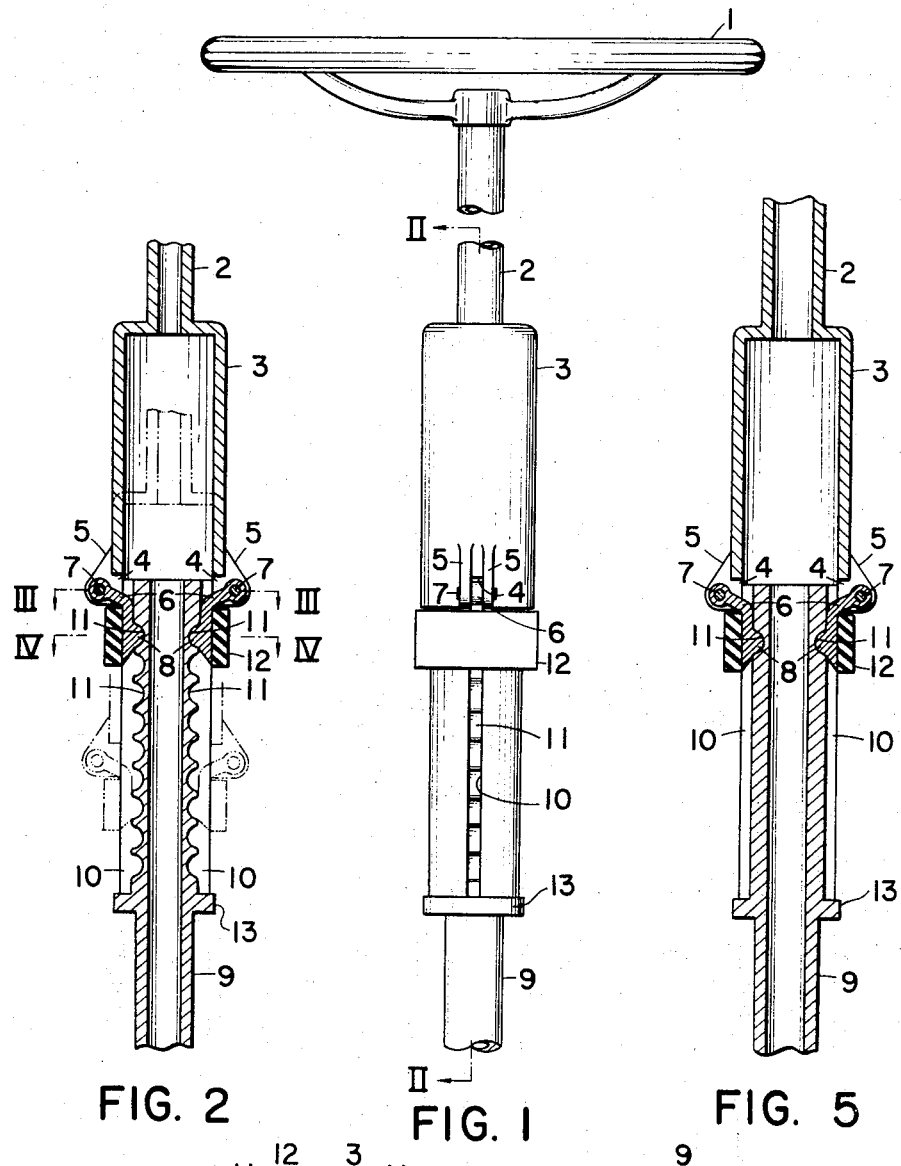

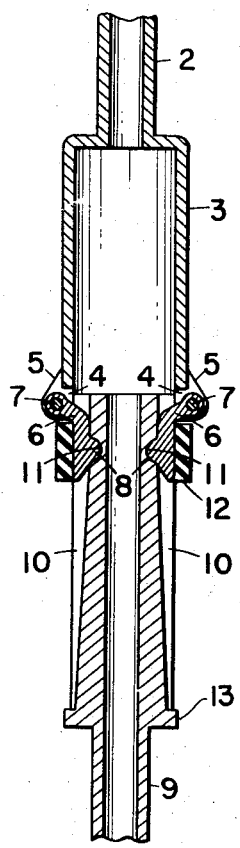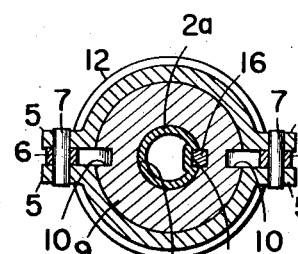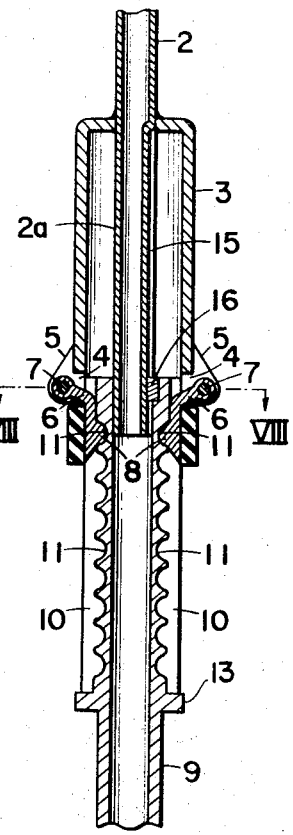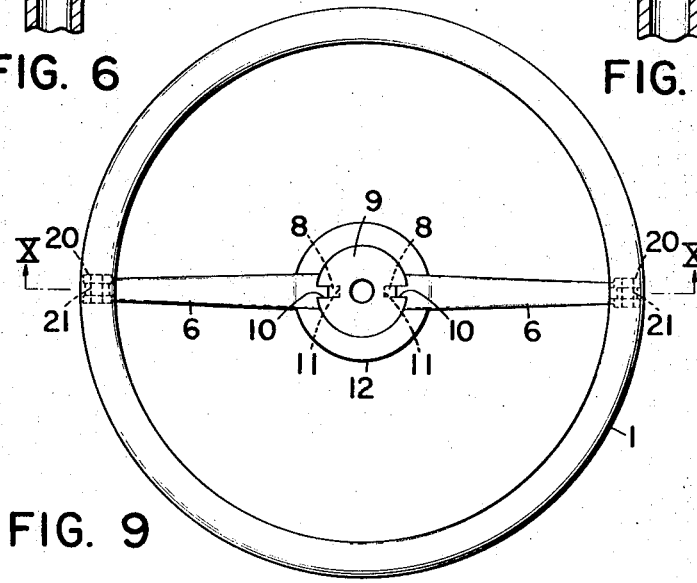
FIG. 6  FIG. 8  FIG. 7
FIG. 9

SHOCK ABSORBING STEERING SHAFT ASSEMBLY

SUMMARY OF THE INVENTION

This invention relates to an improvement in a steering wheel for use in various types of vehicles and ships, and more particularly it relates to a steering wheel device designed such that when a strong downward shock or impact force is imparted to the steering wheel, the latter is caused to move downwardly so as to absorb the energy developed by the shock, thereby protecting the driver from receiving a heavy blow on his abdomen or other body portion.

It is particularly envisaged to provide a shock absorbing steering wheel device of the type referred to, whereby the normal steering operation can be carried on even after the shock has been absorbed.

BRIEF DESCRIPTION OF THE DRAWINGS

Now, the present invention is described in detail by way of some preferred embodiments shown in the accompanying drawings, but it will be understood that the present invention is subject to no restriction by these illustrative embodiments but can be embodied in various other forms within the scope of the claim of the invention.

In the drawings:

FIG. 1 is a front view showing a first embodiment of the present invention;

FIG. 2 is a longitudinal sectional side view taken along the line II—II of FIG. 1;

FIGS. 3 and 4 are enlarged cross-sectional views taken along the lines III—III and IV–IV, respectively, of FIG. 2;

FIGS. 5 and 6 are similar views to FIG. 2, showing a second embodiment and a third embodiment, respectively, of the present invention;

FIG. 7 is a similar view to FIG. 2, showing a fourth embodiment of the present invention;

FIG. 8 is an enlarged cross-sectional view taken along the line VIII—VIII of FIG. 7;

FIG. 9 is a plane view showing a fifth embodiment of the present invention;

DESCRIPTION OF THE PREFERRED EMBODIMENTS

Figure 10:
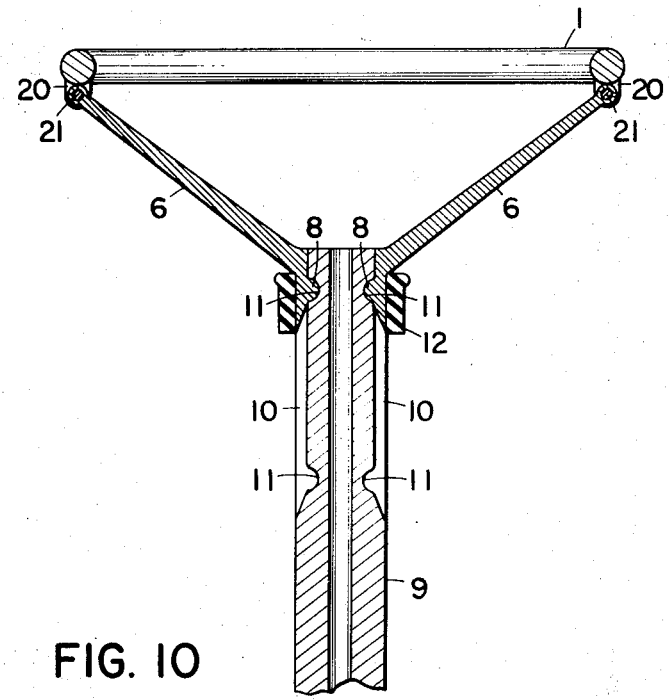
FIG. 10 is a longitudinal sectional front view taken along the line X—X of FIG. 9.

In the drawings, like reference numerals designate like parts throughout.

Referring first to FIGS. 1 to 4 wherein a first embodiment of the present invention is shown, it will be seen that a tubular wheel shaft 2 extends downwardly from the center of a steering wheel 1, and at the bottom of said shaft is integrally joined a large-diameter portion 3.

At the bottom end of said large-diameter portion 3 are formed axial slots 4 which are arranged in diametrically opposed relation and somewhat elongated lengthways, and on both sides of each of said slot 4 are provided outwardly projecting lugs 5.

Between each pair of said lugs 5 is inserted an end portion of a detent or check element 6 which is pivotally secured by a horizontal pin 7 to allow the detent element to rotate about a horizontal axis. On the interior face of the bottom end of each said detent element 6 is formed an engaging protuberance 8.

As will be also seen, a torque shaft 9 for conveying the rotation of the steering wheel 1 to the vehicle's wheels is slidably inserted into said enlarged portion 3 from the bottom thereof. Along the two diametrically opposed sides of said torque shaft 9 are formed vertical slots 10 adapted such that said detent element 6 can slide along such slots but are inhibited from moving sideways. In the bottom wall of each of said vertical slots 10 are formed a plurality of recesses 11 each of which is so shaped as to tightly receive therein the engaging protuberance 8 of each said detent elements 6.

Around the parts of said detent elements 6 where the engaging protuberances 8 are provided, there is fitted an elastic ring 12 made of rubber or metallic spring, whereby normally the engaging protuberances 8 are kept elastically engaged in the topmost recesses 11 in the respective vertical slots 10. The torque shaft 9 is formed with a stopper shoulder or flange 13 the bottom ends of siad vertical slots 10.

It is to be also noted that the bottom end of the enlarged portion 3 of the handle shaft 2 is properly and slidably engaged with the top end of the torque shaft 9 in such a manner that the axes of both shafts 2 and 9 are always in perfect alignment with each other.

The device of the present invention described above normally operates, in quite a same way as the conventional steering assembly. It, however, demonstrates its special characteristics in the even of an accident.

Namely, should a vehicle equipped with the device of the present invention run against an object or be hit from behind by another vehicle and a strong downward impact force is imparted by the driver to the steering wheel 1, the engaging protuberances 8 of the detent elements 6 are forced out of the topmost recesses 11 in the vertical slots 10 in the torque shaft 9 against the holding force of the elastic ring 12 and caused to slide down in the vertical slots 10 as shown by phantom lines in FIG. 2. This allows the steering wheel 1 to move downward accordingly.

When the steering wheel 1 descends by an amount sufficient to absorb the impact force of shock imparted, the engaging protuberances 8 are held in the recesses 11 at the corresponding position in the slots 10 and at the same time the elastic ring 12 contracts to secure the dent or check elements 6 in that position, allowing immediate use of the steering wheel 1 in a normal way.

As is apparent from the foregoing, the present invention provides a very useful shock absorbing steering assembly whereby in case a vehicle having such an assembly should collide with an object or be hit from behind by another vehicle and a heavy impact force is imparted to it the elastic ring 12 is forcibly spread out to absorb at least some of the energy developed by the impact and simultaneously tee steering wheel 1 is immediately caused to descend so that the driver is saved from suffering a fatal blow or injuries in his chest or other body portion. Further even after the steering wheel 1 has des cended as a result of impact, the steering operation thereof can still be made as though it is in normal condition.

Referring to FIG. 5 showing a similar view to FIG. 2, there is shown a second embodiment of the present invention in which no recesses other than the upper or topmost ones 11 are formed in the vertical slots 10 in the torque shaft 9, the remaining portions of the bottom walls of the slots beyond such recesses being smooth. In this embodiment, too, the detent elements 6 are forced out of the recesses 11 to slide downwardly by the strong downward force of the steering wheel 1 against the holding force of the elastic ring 12 so as to absorb a substantial portion of the energy, thereby protecting the driver from receiving a strong blow on his chest or other part of his body as it is hits against the steering wheel 1.

The embodiment shown in FIG. 6 is a modification of that of FIG. 5. Both embodiments are same in that the topmost recesses 11 alone are provided in the vertical slots 10, but the former differs from the latter in that the smooth bottom walls of the vertical slots 10 beyond the topmost recesses 11 are inclined outwardly as they extend towards flange 13 toward the bottom end of the slots 10. In this case, the check elements 6, after forced out of the recesses 11 by the downward force of the steering wheel 1, are gradually spread outwardly to strongly push and spread out the elastic ring 12 so that there is greater energy absorption than in the embodiment of FIG. 5.

Referring now to FIG. 7, it shows a longitudinal sectional side view of a fourth embodiment of the present invention, with FIG. 8 showing a cross-sectional view taken along the line VIII—VIII of FIG. 7.

In this embodiment, the lower portion 2a of the steering wheel shaft 2 extends downwardly through the enlarged portion 3 and fits into the axial hollow 14 in the torque shaft 9. This embodiment is otherwise same as the first embodiment.

Along the exterior of said lower portion 2a of the steering wheel shaft 2 is formed a vertical slot 15 into which is fitted a key 16 provided on the inner face of the axial hollow 14 in the torque shaft 9, whereby the torque of the steering wheel shaft 2 is more positively transmitted to the torque shaft 9 and also the axes of both shafts 2 and 9 are kept always in perfect alignment with each other.

Figure 11:
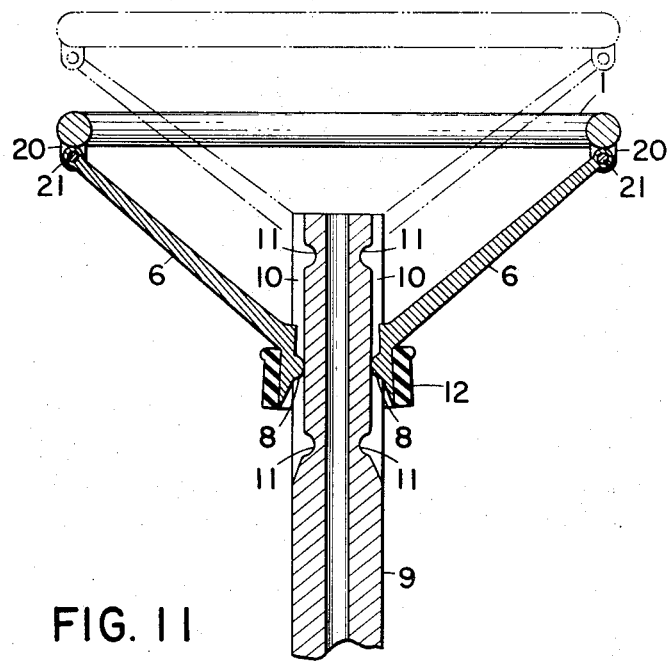
FIG. 11 is a similar view to FIG. 10 but showing a condition where the steering handle is moving downwards.

FIGS. 9 to 11 show still another embodiment of the present invention in which no tubular steering wheel shaft extends from the center of the steering wheel 1. Instead, the top ends of the detent or check elements 6 provided with the engaging protuberances 8 are pivotally secured by means of horizontal pins 21 to the respective lugs 20 provided on the underside of and at the diametrically opposed positions of the steering wheel 1.

The torque shaft 9 is formed with vertical slots 10 the bottom walls of which are formed with recesses 11 as shaped as to snugly receive therein the engaging protuberances 8 of said detent elements 6. Also, an elastic ring 12 is fitted around the parts of said detent elements 6 where the engaging protuberances 8 are provided, whereby under normal conditions the engaging protuberances 8 are kept elastically engaged in the topmost recesses 11, as in the case of the preceding embodiments.

In this embodiment as in the preceding ones, should a strong downward impact force be imparted to the steering wheel 1, the engaging protuberances 8 of the check elements 6 are forced out of the topmost recesses 11 against the action of the elastic ring 12 and caused to slide downwardly as shown in FIG. 11, thereby minimizing a bodily blow or injury to the driver.

It will be readily understood that in this embodiment, it is possible to do away with the recesses 11 except for the topmost ones, with the remaining portion (that is to say, the portion beyond the only recess 11) of the bottom wall of each vertical slot being formed rectilinearly or inclined as in the embodiments of FIGS. 5 and 6.

What is claimed is:

1. A shock absorbing steering wheel assembly comprising plural detent elements each of which has provided on its interior an engaging protuberance and which are pivotally secured to a part of the steering wheel assembly so that they are rotatable about a horizontal axis, a torque shaft for transmitting rotation of a steering wheel to a means for steering, said torque shaft being formed along its external surface with vertical slots in which said detent elements are slidably guided for vertical movement, the bottom wall of each of said vertical slots being formed with recesses adapted to receive therein the engaging protuberances of said detent elements, and an elastic ring fitted around said detent elements so that said engaging protuberances are elastically engaged with certain recesses in the torque shaft, so that when a strong downward shock or impact force is imparted to the steering wheel, said engaging protuberances of said detent elements are forced out of said recesses in the torque shaft and are caused to slide downwardly in said vertical slots against the resilient holding force of the elastic ring.

2. The device as claimed in claim 1, in which said detent elements are pivotally secured to a part of a tubular steering wheel shaft which extends downwardly from the center of the steering wheel.

3. The device as claimed in claim 1, in which said detent elements are pivotally secured to the bottom end of an enlarged portion provided contiguous to the bottom end of the tubular steering wheel shaft, and said torque shaft is slidably inserted into said enlarged portion from below thereof.

4. The device as claimed in claim 1, in which the lower part of said tubular steering wheel shaft is fitted into an axial hollow in said torque shaft.

5. The device as claimed in claim 1, in which said elastic ring is rubber.

6. The device as claimed in claim 1, in which said elastic ring is a metallic spring.

7. The device as claimed in claim 1, in which there are topmost recesses in the torque shaft, and the remaining part of the bottom wall of each of said vertical slot slots beyond said topmost recesses are smooth.

8. The device as claimed in claim 1, in which there are topmost recesses in the torque shaft, and the remaining part of the bottom wall of each vertical slot beyond said topmost recesses are inclined outwardly toward the bottom end of said vertical slot.

9. The device as claimed in claim 1 in which said detent elements are pivotally secured to the underside of the steering wheel and at diametrically opposed positions of said steering wheel.

* * * * *